United States Patent [19]

Rosansky

[11] 3,804,671

[45] Apr. 16, 1974

[54] NON-AQUEOUS BATTERY CONSTRUCTION AND METHOD OF SEALING SAME BY COLD WELDING

[75] Inventor: Martin G. Rosansky, Monsey, N.Y.

[73] Assignee: Power Conversion, Inc., Mt. Vernon, N.Y.

[22] Filed: Sept. 18, 1972

[21] Appl. No.: 290,151

[52] U.S. Cl. ............... 136/6 LN, 136/133, 136/175
[51] Int. Cl. ........................................... H01m 1/02
[58] Field of Search .......... 136/6 LN, 133, 175, 176

[56] References Cited
UNITED STATES PATENTS

| | | | |
|---|---|---|---|
| 3,031,517 | 4/1962 | Peters | 136/133 |
| 3,426,170 | 2/1969 | Miller | 136/176 |
| 3,736,190 | 5/1973 | Dey et al. | 136/133 |

Primary Examiner—Donald L. Walton
Attorney, Agent, or Firm—Sandoe, Hopgood & Calimafde

[57] ABSTRACT

A non-aqueous battery, such as a lithium battery, includes a casing containing electrodes and an electrolyte. A battery top is disposed across the open end of the casing with an upstanding tube-like portion extending therefrom. An annular insert is disposed within the tube-like projection. Both the top and the insert are formed of a malleable metal, such as aluminum. To hermetically seal the battery after its liquid contents has been added through the tube-like projection, the top is pinched along a plane projecting radially through the tubulation and the insert thereby forming a cold weld. This provides a unique solution to the problems of leakage and contamination. It is thus possible to simply and effectively contain high vapor pressure anhydrous liquid components of an electrolyte.

11 Claims, 2 Drawing Figures

3,804,671

NON-AQUEOUS BATTERY CONSTRUCTION AND METHOD OF SEALING SAME BY COLD WELDING

BACKGROUND OF THE INVENTION

This invention relates to batteries, and more particularly to a battery construction and a method for use therewith whereby effective hermetic sealing is accomplished by cold welding. This construction and method are particularly applicable to non-aqueous batteries and batteries containing high vapor pressure liquid electrolyte components.

It is known to fill a non-aqueous battery, such as a lithium battery, through an upstanding tube-like projection that extends from and is integrally formed with the battery top. After the battery has been filled, the tubulation, which is formed of a malleable metal, is pinched and thereby cold welded. This technique for sealing the battery can be used to avoid contamination of the non-aqueous battery contents by even a small quantity of ambient moisture. There have, however, been persistent problems associated with sealing non-aqueous batteries. It has been found to be very difficult to consistently and reliably obtain an adequate cold weld by pinching off the tube-like portions of the tops on a volume production basis. An undesirably high proportion of batteries thus produced have developed leaks.

Recent advances in non-aqueous battery technology have made possible greatly increased energy densities and significantly improved performance in many respects. These improved batteries include high vapor pressure electrolyte components, and the problem of sealing these batteries is, accordingly, becoming critical. In addition, the most advanced developments in non-aqueous batteries, such as lithium batteries, require the exclusion of water vapor to a substantially greater extent than previously attempted in a production basis. Thus, the filling techniques operate to compound the difficulty of obtaining a reliable hermetic seal. There are, of course, other methods of sealing battery tops, but none are as simple or lend themselves as well to automated techniques for filling non-aqueous batteries as the cold welding technique described here. There is, therefore, a need for an improved, simple and effective seal that lends itself to consistent and reliable production of non-aqueous batteries on a volume basis.

SUMMARY OF THE INVENTION

It has been discovered that the difficulty in obtaining a reliable seal of a non-aqueous battery by pinching and cold-welding the tubulation of the battery tops is a result of the proportions and dimensions of the tops. These tops must have a flange-like portion that covers the open end of the cylindrical battery case and an upstanding tube-like projection through which the battery is filled. The top must have a minimum thickness to provide the necessary strength and durability. The tube-like portion must have adequate length to enable the cell to be handled and filled by automated equipment. The top is formed by stamping a malleable metal over a mandrel and thus drawing therefrom te desired elongated, upstanding portion. The strength, ductility and malleability of the metal, as well as the necessary strength of the mandrel, limits the minimum diameter of the opening in the tubulation through which the battery is filled. It has been discovered that the cell could be filled through a considerably smaller opening if it were possible to form battery tops having the desired shape. Such tops are not, however, readily mass producible.

The problem presented by the unnecessarily large diameter of the tubulation derives from the fact that the difficulty of reliably obtaining a good seal by cold welding increases as the size of the opening increases in relation to the thickness of the metal. Seizing upon the recognition of this controlling factor, applicant has devised a method of obtaining a reliable cold welded seal. A small annular insert having an outside diameter approximately equal to the inside diameter of the tube-like portion of the battery top is inserted into the tubulation through the hole formed in the flange portion of the top, the insert being axially aligned with the tube-like portion. The insert and the top are formed of malleable metal. Aluminum has been found to be particularly suitable for this purpose, especially for lithium batteries containing sulfur dioxide. Of course, the opening that extends axially through the annular insert is considerably smaller than the inside diameter of the tubulation. Thus, when the tubulation is pinched and cold welded along a plane projecting radially through the insert, a permanent seal having the desired reliability is formed.

One aspect of the invention is a method of constructing a battery by bringing together a battery top and an insert therefor, the top having a flange portion and an integrally formed upstanding elongated tube-like portion which is joined to and drawn from the flange-like portion at one end thereof. The insert is annular is shape and has an outside diameter of approximately the same as the inside diameter of the tube-like portion. The insert is axially aligned with the tube-like projection and placed therein. Electrodes are placed within the battery casing and the top is attached to the casing as a cover therefor with the tube-like projection extending away from the casing. The battery is then filled through the tube-like projection. Finally, the battery is sealed by pinching and cold welding the tube-like portion and the insert along a plane projecting radially through the tube-like projection and the insert. This forms an effective and permanent hermetic seal by a method which is suitable for mass production. A conductive metal cap may then be fitted over the remaining portion of the tubulation to form a battery terminal.

BRIEF DESCRIPTION OF THE DRAWINGS

For an understanding of additional aspects of the preferred embodiment of the present invention, reference may be made to the detailed description which follows, taken in conjunction with the accompanying drawings in which.

DESCRIPTION OF THE PREFERRED EMBODIMENT

Figure 1:
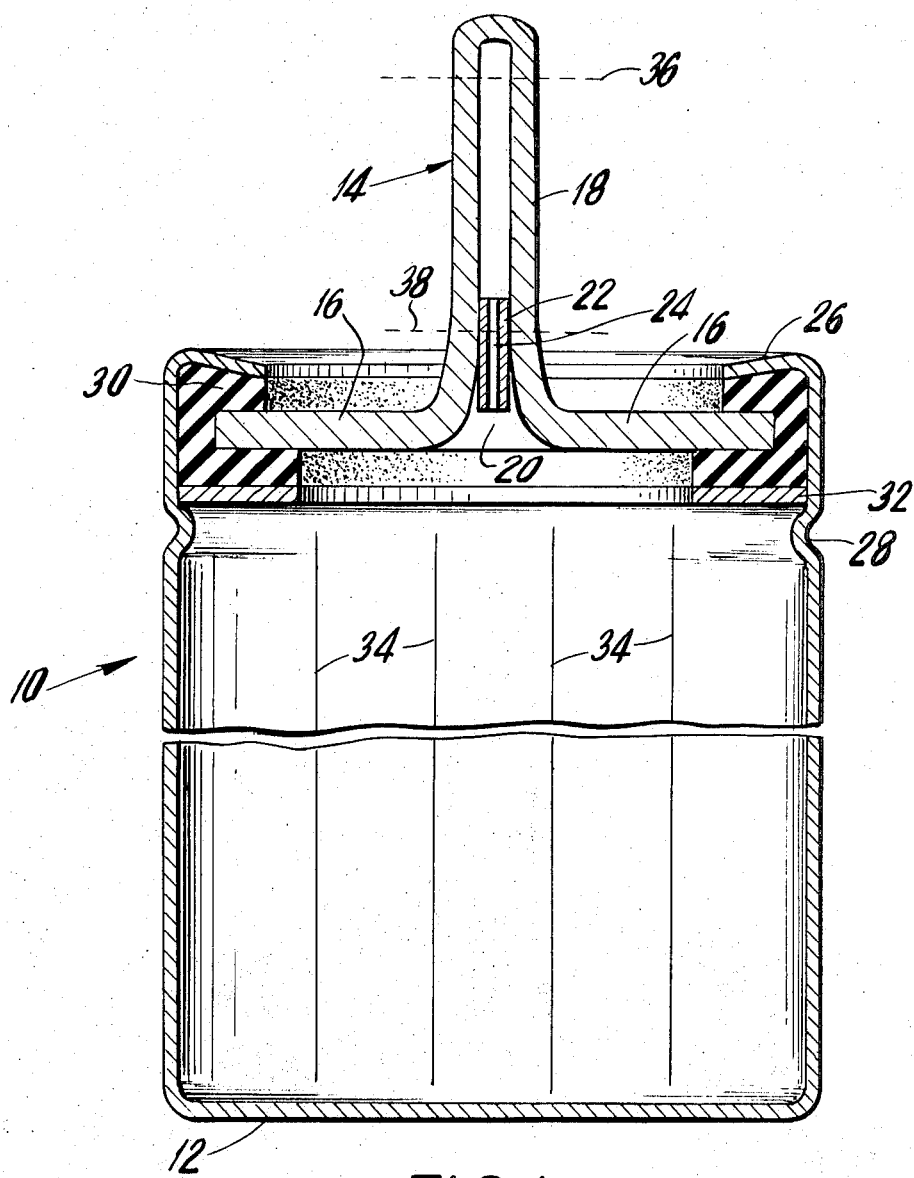
FIG. 1 is a cross-sectional view of a battery constructed in accordance with the invention which has not as yet been filled and hermetically sealed.

A battery constructed in accordance with the invention preparatory to filling and sealing is shown, in cross section, in FIG. 1. It includes a cylindrical battery casing which is closed at one end by a bottom wall 12 and open at the opposite end. Preferably, the casing 10 is made of low carbon, cold rolled steel. The open end of the casing 10 is covered by a battery top 14 which includes a disk-shaped flange portion 16 and an upstanding tube-like portion 18 which is integrally formed with and joined to the flange portion 16. The tubulation 18 extends away from the casing 10 and is closed at its freestanding end. The tubulation 18 is open at its opposite end forming a hole 20 centrally located on the inside surface of the flange portion 16. An annular insert 22, having an outside diameter substantially equal to the inside diameter of the tubulation 18, is oriented in axial alignment with the tubulation 18 and disposed therein. A passageway 24 extends axially through the center of the insert 22 which is, of course, substantially smaller in diameter than the inside of the tubulation 18. The tubulation 18 and the insert 22 are both made of a suitable malleable metal, such as aluminum or copper.

The open end of the casing 10 is folded inwardly to form a ridge 26. A neck 28 is formed in the casing 10 which extends circumferentially about the casing at a predetermined distance below the ridge 26. The neck 28 may be formed by any necking technique which produces the desired structure. One such necking technique is disclosed in co-pending application Ser. No. 148,458 entitled "Improved Battery Sealing and Component Connecting Method" filed on June 1, 1971. The outer periphery of the top 14 is engaged by an elastomeric, insulating ring 30 which serves to electrically insulate the top 18 from the casing 10. The insulating ring 30 is disposed between the ridge 26 and the neck 28. A metallic thrust ring 32 is disposed between the lower surface of the insulating ring 30 and the neck 28. The metal ring 32 provides a good thrust surface which forces the insulating ring 30 against the ridge 26 to form a tight hermetic seal. Disposed within the casing 10 and below the metal ring 32 is a plurality of electrodes 44 (shown schematically).

The battery construction shown in FIG. 1 is particularly suitable for a non-aqueous battery. The unfilled battery shown there is hermetically sealed against the ambient atmosphere. Accordingly, it can be assembled in an inert or dry atmosphere, and can then be stored or handled prior to filling without the electrodes 34 being contracted by ambient water vapor. This is particularly critical if, for example, the electrodes 34 are made of lithium. Recent advances in lithium battery technology have made possible cells having a very high energy density and other desirable characteristics such as high permissible current drain and extremely favorable low temperature operation. However, the filling of these batteries with a liquid electrolyte and the hermetic sealing of the battery after it has been filled presents a difficult technical problem.

In accordance with this invention, the tube-like portion 18 of the battery top 14 is first cut along the plane indicated by the broken line 36 or punctured at its closed end. The liquid electrolyte then passes through the tubulation 18 and through the passageway 24 in the center of the annular insert 22, thus entering the casing 10 and contacting the electrodes 34. After the casing 10 has been filled to the desired level, the battery top 14 is pinched between two cylindrical rocks to form a cold weld along a plane, indicated by the broken line 38, which bisects the tube-like portion 18 and the insert 22. Here, the insert 22 plays an important role in forming a reliable hermetic seal under production conditions.

The quality of the seal formed by pinching off the tubulation 18 is a function of the diameter of the opening of that tubulation. Although a large opening is not required for filling purposes, the technique by which the top 14 is made imposes severe limitations on its configuration and dimensions. This top is made by stamping malleable metal over a mandrel to form an elongated tubulation which is thus drawn therefrom. In view of the strength, ductility and malleability of the metal and the required strength and dimensions of the battery, this opening cannot be made sufficiently small to reliably form an effective seal under production conditions. However, the insert 22 provides a sufficient quantity of metal in relation to the size of the opening to form a reliable and effective cold-weld.

Figure 2:
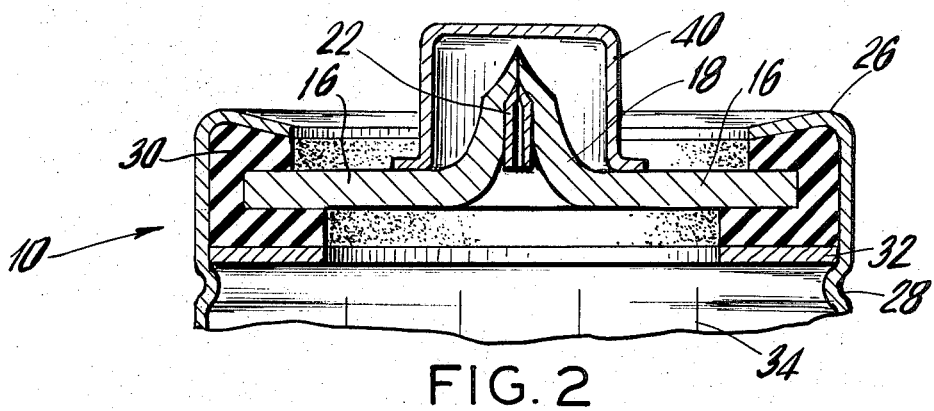
FIG. 2 is a cross-sectional view of the battery of FIG. 1 after filling and sealing.

FIG. 2 is a fragmentary view of a battery in which a completed hermetic seal has been formed in accordance with the above description. As shown there, a conductive metal cap 40 covers the remaining portion of the tubulation 18 and is conductively bonded to the flange 16 by spot welding or conductive epoxy. This cap 40 provides an easily contacted battery terminal of the conventional type. It should be noted that in FIG. 2, as in FIG. 1, the drawings are intended only to give an understanding of the invention. Accordingly, they should not be viewed as production drawings and are not shown to scale.

It has been found that a battery constructed in this manner provides a cold-weld seal that is sufficiently strong that it can be used with a liquid electrolyte having high vapor pressure components. Thus, a simple and efficient method is provided for sealing a lithium battery in which one component of the electrolyte is sulfur dioxide used as a depolarizer. Aluminum, which is the preferred material for the top 14 and insert 22, is electrochemically compatible with lithium-sulfur dioxide systems. The need for a more complex sealing technique is thus obviated and, at the same time, the percentage of batteries rejected because of the faulty seal is significantly reduced if not eliminated.

The embodiment of the invention described above is included herein by way of example. Many modifications and variations of this exemplary embodiment will, of course, occur to those skilled in the art. However, the spirit and scope of the invention is not limited other than by the claims which follow.

I claim:

1. In a non-aqueous battery including a casing having an open end, at least two electrodes and an electrolyte in contact with each other disposed within said casing, and a top formed of a malleable metal covering the open end of the casing having a flange portion and an upstanding tube-like portion integrally formed therewith and drawn from the flange portion, the improvement comprising an annular insert formed of malleable metal disposed within the tube-like portion, the tube-like portion and the insert being pinched and cold welded along a plane projecting radially therethrough, thereby sealing the battery against entry of the ambient atmosphere and escapement of its contents.

2. The battery of claim 1, wherein the outer periphery of the flange portion of the battery top is engaged by an elastomeric insulating ring, the walls of the casing form a neck spaced from the open end of the casing, and the walls are bent inwardly to form a ridge at the open end of the casing thereby retaining the elastomeric ring between the neck and the ridge.

3. The battery of claim 1, wherein the malleable metal of which the top is formed is aluminum or copper.

4. The battery of claim 1, further comprising a cap made of a conductive material covering the upstanding tube-like portion.

5. The battery of claim 1, wherein said battery contains lithium.

6. The battery of claim 1, wherein said battery contains an anhydrous liquid electrolyte under pressure.

7. The battery of claim 1, wherein the electrolyte contains sulfur dioxide.

8. A method of assembling a non-aqueous battery comprising:
   bringing together a battery top and an insert therefor, the top having a flange portion and an integrally formed upstanding elongated tube-like portion which is joined to the flange portion at one end thereof, the insert being annular in shape and having an outside diameter approximately the same as the inside diameter of said tube-like portion, both the battery top and the insert being formed of a malleable metal;
   axially aligning the insert with the tube-like portion and placing the insert within the tube-like portion;
   placing electrodes within a battery casing;
   attaching the battery top to the casing as a cover therefor with the tube-like portion extending away from the casing;
   filling the battery through the tube-like portion; and,
   pinching off and cold welding the tube-like portion and the insert along a plane projecting radially therethrough, whereby the battery is effectively and permanently sealed.

9. The method of claim 8, wherein the battery is filled with a high vapor pressure liquid electrolyte.

10. The method of claim 8, wherein the battery is filled with a liquid electrolyte including sulfur dioxide.

11. A method of assembling and hermetically sealing a non-aqueous battery comprising:
    stamping a piece of malleable aluminum over a mandrel and thereby forming a battery top including a flange portion and an integrally formed upstanding elongated tube-like portion which is drawn therefrom, the tube-like portion being closed at its freestanding end;
    bringing together the battery top and an aluminum insert therefor, the insert being annular in shape and having an outside diameter approximately the same as the inside diameter of the tube-like portion;
    axially aligning the insert with the tube-like portion and placing the insert within the tube-like portion;
    placing electrodes, one of which is made of lithium, within a battery casing;
    attaching the battery top to the casing as a cover therefor with the tube-like portion extending away from the casing, thereby sealing the interior of the casing against the ambient atmosphere;
    opening the freestanding end of the tube-like portion and injecting a liquid electrolyte including sulfur dioxide into the casing through the opening thus formed;
    pinching off and cold welding the tube-like portion and the insert along a plane projecting radially therethrough, whereby the battery is effectively and permanently sealed; and
    placing a conductive metal cap over the remaining part of the tubulation thereby forming a battery terminal.

* * * * *